(12) United States Patent
Kinoshita et al.

(10) Patent No.: US 6,526,324 B1
(45) Date of Patent: Feb. 25, 2003

(54) CONTROLLER FOR INDUSTRIAL MACHINE

(75) Inventors: Jiro Kinoshita, Yamanashi (JP); Yutaka Muraoka, Yamanashi (JP)

(73) Assignee: Fanuc Ltd., Yamanashi (JP)

( * ) Notice: Subject to any disclaimer, the term of this patent is extended or adjusted under 35 U.S.C. 154(b) by 0 days.

(21) Appl. No.: 09/199,274

(22) Filed: Nov. 25, 1998

(30) Foreign Application Priority Data

Nov. 26, 1997 (JP) .............................................. 9-339457

(51) Int. Cl.[7] .............................................. G05B 13/02
(52) U.S. Cl. .............................. 700/52; 700/53; 700/67; 700/68; 700/160; 700/169; 700/192; 318/564; 318/565; 318/567; 318/610
(58) Field of Search ............................... 700/52, 53, 54, 700/56, 57, 58, 67, 70, 160, 161, 169, 174, 186, 192, 236, 241; 318/564–565, 563, 610; 713/502; 709/234

(56) References Cited

U.S. PATENT DOCUMENTS

| | | | |
|---|---|---|---|
| 4,546,437 A | | 10/1985 | Bleckmann et al. .......... 701/70 |
| 4,607,338 A | | 8/1986 | Kitagawa .................... 700/114 |
| 4,996,655 A | * | 2/1991 | Chadwick et al. ............ 700/17 |
| 5,013,989 A | * | 5/1991 | Kurakake et al. ........... 318/625 |
| 5,025,200 A | * | 6/1991 | Kurakake et al. ........... 318/569 |
| 5,157,595 A | * | 10/1992 | Lovernich ...................... 700/7 |
| 5,262,954 A | * | 11/1993 | Fujino et al. ............... 700/112 |
| 5,274,546 A | * | 12/1993 | Kinoshita .................... 700/81 |
| 5,656,906 A | * | 8/1997 | Iwashita et al. ............ 318/568 |
| 5,777,870 A | * | 7/1998 | Takaku et al. ................. 700/3 |
| 5,825,150 A | * | 10/1998 | Kachi et al. ................ 318/610 |
| 6,150,786 A | * | 11/2000 | Kinoshita et al. ........... 318/564 |

FOREIGN PATENT DOCUMENTS

| | | |
|---|---|---|
| DE | 3118065 A1 | 11/1982 |
| DE | 3424246 A1 | 1/1986 |
| DE | 3424246 A | 1/1986 |
| DE | 3627588 A1 | 2/1987 |
| DE | 3718582 A1 | 12/1987 |
| DE | 19509150 A1 | 9/1996 |
| EP | 0 128 959 A1 | 12/1984 |
| EP | 0658832 A2 | 12/1994 |
| EP | 0658832 A3 | 5/1998 |
| EP | 0919894 A2 | 6/1999 |
| EP | 0919894 A3 | 8/1999 |
| GB | 2221063 A | 1/1990 |
| JP | 48-63176 | 9/1973 |
| JP | 50-157778 | 12/1975 |
| JP | 51120083 A | 10/1976 |
| JP | 59-40905 | 3/1984 |
| JP | 60020202 A | 1/1985 |
| JP | 01263801 A | 10/1989 |
| JP | 09198124 A | 7/1997 |
| JP | 11161312 A | 6/1999 |
| WO | WO 96/28769 | 2/1996 |

\* cited by examiner

Primary Examiner—Ramesh Patel
(74) Attorney, Agent, or Firm—Staas & Halsey LLP

(57) ABSTRACT

A controller capable of monitoring a receiving circuit for receiving machine information. Machine information from a machine is received by a plurality of independent systems and the external signals received by the plurality of systems are compared, thereby, a receiving state of the receiving circuit is monitored. The controller includes a plurality of independent receiving units for receiving the external signal and monitoring units for comparing signals received by the plurality of receiving units, to monitor the receiving units based on a result of the comparison.

14 Claims, 11 Drawing Sheets

CONTROLLER FOR INDUSTRIAL MACHINE

BACKGROUND OF THE INVENTION

1. Field of the Invention

The present invention relates to a controller for controlling an industrial machine, and more particularly to a receiving circuit for receiving information from an industrial machine.

2. Description of the Related Art

In a controller for controlling an industrial machine, such as a numerical controller and a robot controller, external information outputted from the machine is received by a receiving circuit and the received signals are processed by a CPU in a numerical controller for controlling the machine.

FIG. 13 is a block diagram for illustrating an arrangement of a receiving section for external information in a conventional numerical controller. A numerical controller 10 comprises a CPU 1 for generally controlling the numerical controller and a receiving circuit 4 for receiving machine information from a machine 6. The machine information received by the receiving circuit 4 is inputted to the CPU 1 through a CPU 2 for performing input/output control. The input/output control of the machine information can be performed by the CPU 1 without using the CPU 2.

The machine information outputted from the machine 6 includes information of an operating state of the machine, such as an emergency stop signal.

Since the machine information from the machine is received by the single receiving circuit in the conventional numerical controller, there rises a problem that the machine information is hardly received from the machine when the receiving circuit is in trouble. In particular, if important machine information such as the emergency stop signal is not received, there arises a serious problem with respect to safety.

SUMMARY OF THE INVENTION

An object of the present invention is to provide a numerical controller capable of monitoring a receiving circuit to which information from a machine is inputted.

According to the present invention, machine information from the machine is received by a plurality of independent systems and the signals received by the plurality of systems are compared, thereby the receiving state of the receiving circuit is monitored.

The controller of the present invention comprises: a plurality of receiving means provided independently of one another for respectively receiving a signal from the industrial machine; and monitoring means for comparing signals received by the plurality of receiving means and monitoring the receiving means based on a result of the comparison.

The receiving means is provided in the controller and is connected to the industrial machine via an input/output terminal provided in the controller. An external signal represents an external state including an operating state of the machine, such as an emergency stop signal. The receiving means of the present invention receives all or some of the signals outputted from the machine. The monitoring means may be provided with a function of selecting the external signal to be compared, from the signals received by the receiving means, so that a predetermined signal such as an emergency stop signal is selected as the signal to be compared.

The plurality of independent receiving means respectively receives a signal from the industrial machine. If the received signal include a signal to be compared, the monitoring means makes a comparison of the signals received by the plurality of receiving means. In the comparison of the received signals, if the received signals agree with one another, it is determined that the receiving means properly operates. If the external signals disagree with one another, it is determined that the receiving means is in trouble. The monitoring means has a function of notifying the controller or an external equipment about an abnormality of the receiving means. This monitoring means can be constituted by software or hardware.

The receiving means includes a receiving circuit and a signal line for connecting with the industrial machine. Thereby, the controller of the present invention can monitor a receiving system including the receiving circuit and the signal line connected with the industrial machine.

The signal line may connect a numerical controller with a servo amplifier, thereby an existing signal line connected with the numerical controller can be utilized to have an advantage that the numerical controller need not be provided with a new connection port.

According to an aspect of the present invention, the monitoring means is provided commonly to the plurality of receiving means. According to another aspect, a plurality of monitoring means are provided so that each monitoring means is associated with each of the plurality of receiving means. The monitoring means can be constituted by providing a monitoring function in a control circuit of the controller or providing a monitoring circuit independently of the control circuit in the controller.

Further, the monitoring means may constituted by an input/output control circuit between the receiving means and the control circuit of the numerical controller, or a monitoring circuit connected to the receiving means.

In the case where the monitoring means is provided for each receiving means, one of the monitoring means receives a signal received by the receiving means associated with the other monitoring means from the other monitoring means. The one monitoring means compares the signal received by the receiving means associated with the other monitoring means and the signal received by the receiving means associated with the one monitoring means.

Further, the other monitoring means receives a signal received by the receiving means associated with the one monitoring means from the one monitoring means, and compares the signal received by the receiving means associated with the one monitoring means with the signal received by the receiving means associated with the other monitoring means. Thereby, the external signal received by the one monitoring means and the external signal received by the other receiving means are cross-checked. A criterion for the comparison may be set up by a whole agreement or an agreement of majority of the plurality of external signals.

DETAILED DESCRIPTION OF THE PREFERRED EMBODIMENTS

Figure 1:
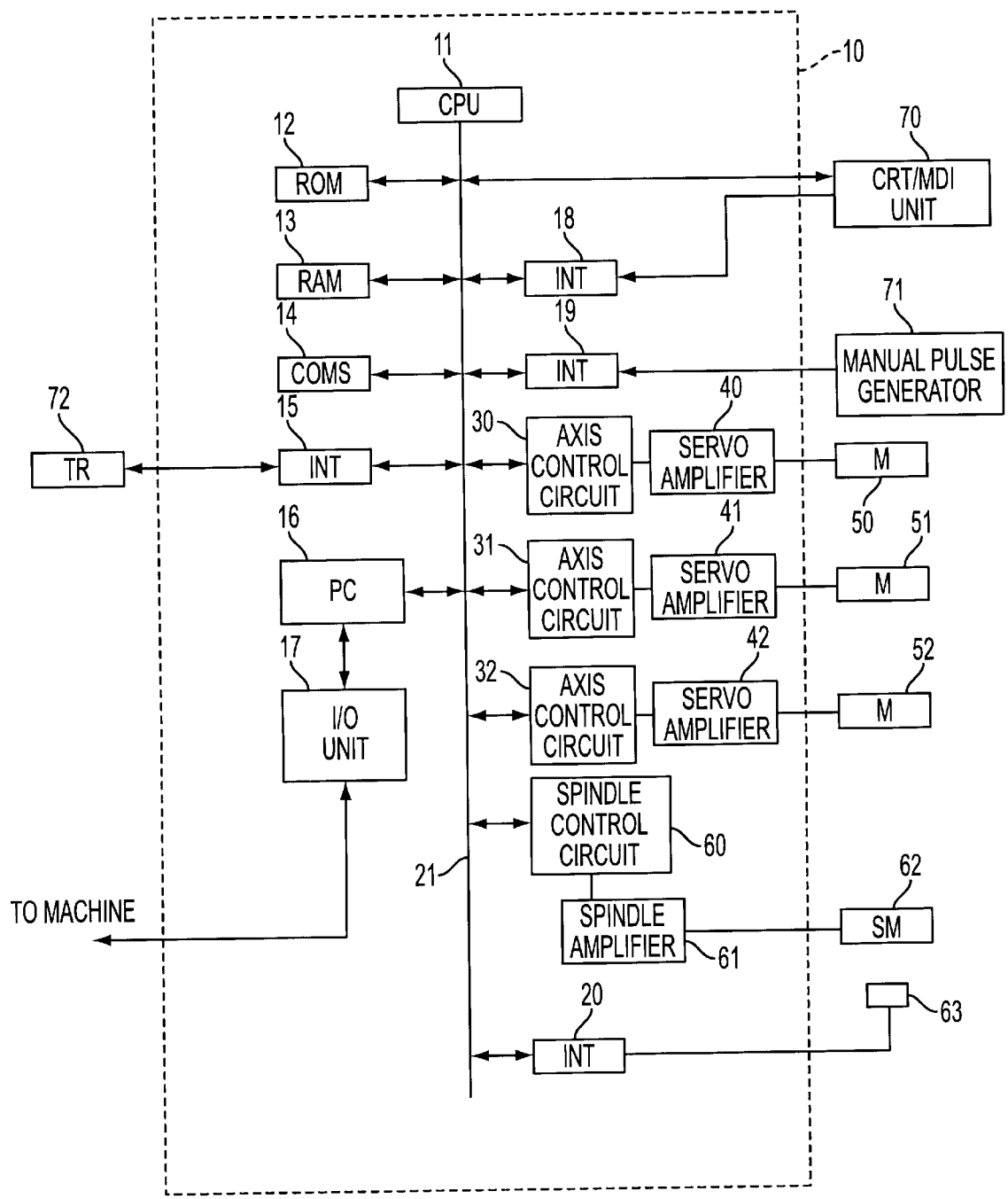
FIG. 1 is a block diagram showing a schematic arrangement of a numerical controller as one example of a controller in accordance with the present invention.

FIG. 1 shows a schematic configuration of a numerical controller as one example of a controller in accordance with the present invention. In FIG. 1, a processor 11, which is a processor for controlling a numerical controller 10 as a whole, reads a system program stored in a ROM 12 via a bus 21, and controls the numerical controller 10 as a whole according to this system program. A RAM 13 stores temporary calculation data, display data, and various data which are inputted by an operator via a CRT/MDI unit 70. A CMOS memory 14 is backed up by a battery (not shown), so that it is configured as a nonvolatile memory in which a storage state is kept even if a power source for the numerical controller 10 is turned off. The CMOS memory 14 stores an operation program read via an interface 15, an operation program inputted via a CRT/MDI unit 70, and other programs. Also, in the ROM 12, there have been beforehand written various system programs for performing processing of edit mode necessary for the preparation and editing of operation program and processing of playback mode for automatic operation.

The interface 15, which is an interface for external equipment capable of being connected to the numerical controller 10, is connected to external equipment 72 such as an input/output means and an external storage. An operation program and other programs are read from the input/output means, the external storage, or the like, and the operation program edited in the numerical controller 10 is outputted to the input/output means and the external storage.

A PC (programmable controller) 16 controls an auxiliary device on the working machine side, for example, an actuator such as a robot hand for changing tools by using a sequence program stored in the numerical controller 10. The data is converted into a signal necessary for the auxiliary device side by using the sequence program, for example, according to M function (miscellaneous function), S function (spindle speed function), and T function (tool function) commanded by the operation program, and is outputted to the auxiliary device side through an I/O unit 17. By this output signal, various actuators and other auxiliary devices are operated. Also, the PC receives a signal of a limit switch on the side of the machine tool body and auxiliary device and various switches on a control panel provided on the machine tool, and delivers it to the processor 11 after necessary processing.

An image signal such as the current position of each axis of machine tool, alarm, parameter, and image data is sent to the CRT/MDI unit 70, and is displayed on a display thereof. The CRT/MDI unit 70 is a manual data input device provided with a display, a keyboard, and the like. An interface 18 receives data from the keyboard of the CRT/MDI unit 70 and delivers it to the processor 11. An interface 19, which is connected to a manual pulse generator 71, receives a pulse from the manual pulse generator 71. The manual pulse generator 71, which is mounted on the control panel of the machine tool body, is used for precisely positioning a movable section of the machine tool by axis control by means of distributed pulses based on manual operation.

Axis control circuits 30 to 32 receive a movement command of each axis from the processor 11, and output the command of each axis to servo amplifiers 40 to 42. The servo amplifiers 40 to 42 receive this command and drive servomotors 50 to 52 for each axis of the machine tool. In this case, each of the servomotors 50, 51 and 52 is used for driving of straight movement axes X, Y and Z for table movement. Also, in some cases, depending on the configuration of machine tool, any of the servomotors 50 to 52 is used for driving of a first rotating shaft B and a second rotating shaft C on a rotary head. The servomotor 50 to 52 for each axis incorporates a pulse coder for detecting position, so that a position signal from this pulse coder is fed back as a pulse train. In some cases, a linear scale can be used as a position detector. Also, a speed signal can be generated from this pulse train. In FIG. 1, the explanation of the feedback of position signal and the speed feedback is omitted.

A spindle control circuit 60 receives a main spindle rotation command to the machine tool, and outputs a spindle speed command to a spindle amplifier 61. The spindle amplifier 61 receives the spindle speed command, and makes the machine tool rotate a main spindle motor 62 at a commanded cutting rotational speed. The main spindle motor 62 is connected with a position coder 63 via a gear or a belt or the like. The position coder 63 outputs a feedback pulse in synchronization with the rotation of main spindle, and the feedback pulse is read by the processor 11 via an interface 20.

Figure 2:
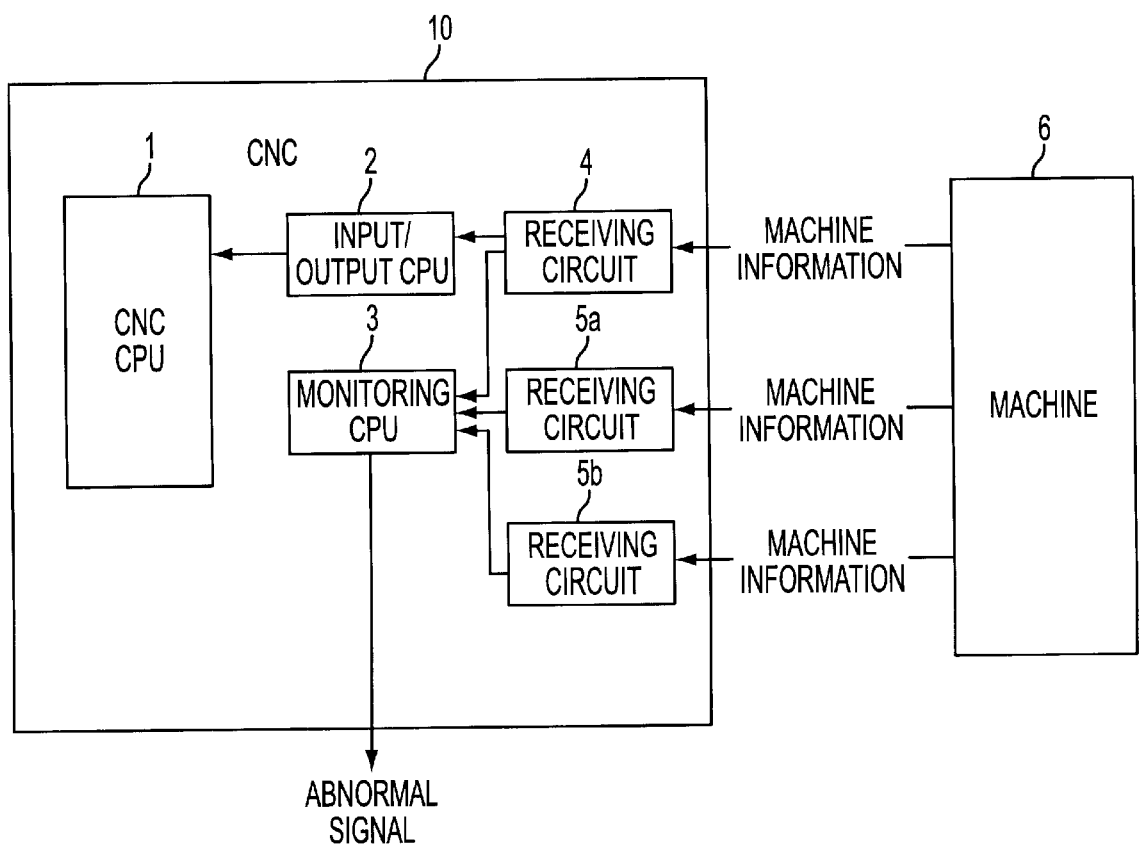
FIG. 2 is a block diagram showing an arrangement of a numerical controller in accordance with the invention, in which a monitoring circuit is provided commonly to a plurality of receiving means.

FIG. 2 is a schematic block diagram for illustrating the outline of a numerical controller in accordance with the present invention.

In FIG. 2, a control section 1 is a control section for controlling a numerical controller 10. Usually, this control section 1 receives an external signal such as machine information from an external means such as a machine 6 via a receiving system such as a signal line and a receiving circuit 4 and an input/output circuit 2. The numerical controller in accordance with the present invention has a configuration in which receiving circuits 5a and 5b for receiving an external signal (machine information) are added independently to the aforesaid receiving circuit 4. It is to be noted that at least one receiving circuit 5 is added, whereby the numerical controller 10 has at least two receiving circuits. In FIG. 2, the receiving circuits 5a and 5b are added, and a total of three receiving circuits 4, 5a and 5b are provided in the numerical controller 10. Here, the receiving circuits 5a and 5b are elements for monitoring the receiving circuit 4.

A monitoring circuit 3, which is a monitoring means for monitoring the receiving circuit 4, receives an external signal received by the receiving circuit 4, which sends the external signal to the control section 1, and at least one of external signals received by the receiving circuits 5a and 5b provided for monitoring, and makes a comparison between these external signals. If the monitoring circuit 3 detects an abnormality of receiving circuit in the comparison of external signals, it sends the abnormal signal to the outside or the control section 1 of the numerical controller to perform abnormality processing. FIG. 2 shows an example in which the abnormal signal is sent to the outside.

The monitoring circuit 3 may be an independent circuit or may be incorporated in the control section 1. In the latter case, processing is performed by a CPU in the control section 1.

Next, a configuration having two receiving circuits will be explained with reference to a schematic block diagram of FIG. 3, a schematic block diagram for illustrating a connection of a numerical controller with a machine of FIG. 4, and flowcharts of FIGS. 5 and 6.

Figure 3:
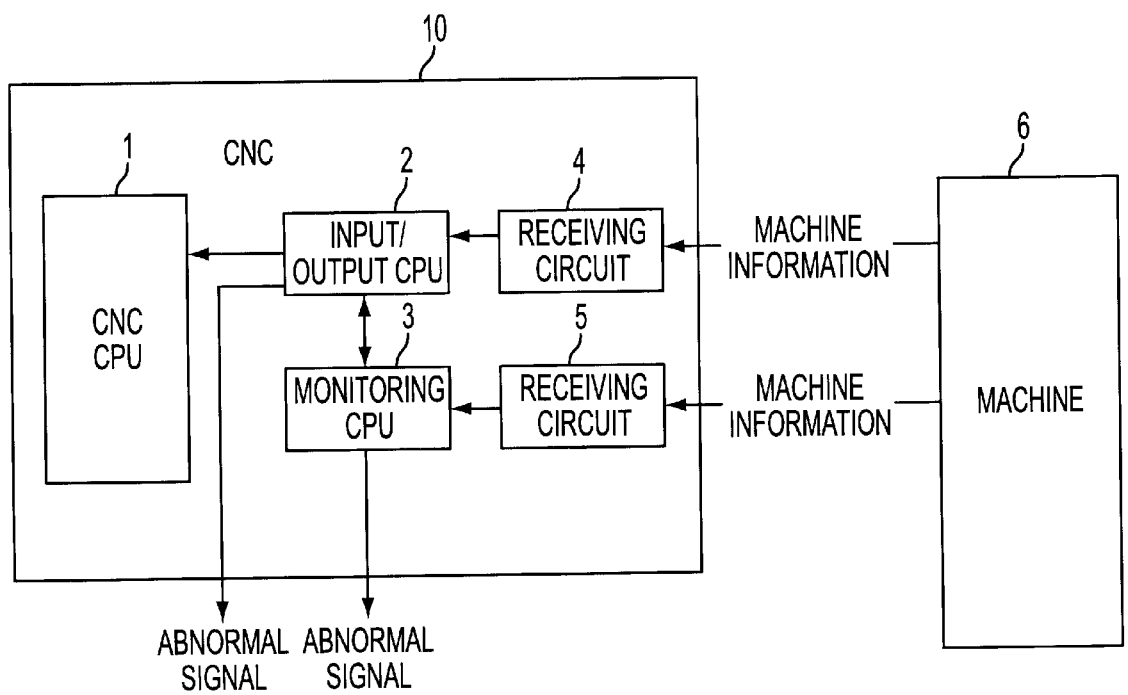
FIG. 3 is a block diagram showing a numerical controller having an arrangement for cross-checking signals received by two receiving circuits.

Referring to FIG. 3, a receiving system including a receiving circuit 4 inputs an external signal such as machine information from a machine 6 to a control section 1 via an input/output circuit 2. In order to monitor the receiving circuit 4, a receiving circuit 5 and a monitoring circuit 3 are added, and a signal line independent of a signal line for the receiving circuit 4 is connected between the machine 6 and the receiving circuit 5, whereby the receiving circuit 5 receives the same machine information as the machine information received by the receiving circuit 4. The machine information received by the receiving circuit 5 is sent to the monitoring circuit 3. The machine information received by the receiving circuit 4 and the machine information received by the receiving circuit 5 are compared by both of the input/output circuit 2 and the monitoring circuit 3 to make a cross-check.

In the configuration shown in FIG. 3, the numerical controller 10 and the machine 6 are connected to each other by means of I/O units 17 and 17' on the side of the numerical controller 10. The I/O unit 17 and a signal line therefor are parts provided usually in the numerical controller 10, while the I/O unit 17' and a signal line therefor are parts newly added to monitor the receiving circuit. Also, when motors 50, 51 and 52 for three axes are driven by the numerical controller 10, the driving is performed via amplifier circuits 40, 41 and 42 such as servo amplifiers.

In the configuration shown in FIG. 3, the receiving circuit is monitored by the cross-check performed by both of the input/output circuit 2 and the monitoring circuit 3. FIG. 5 is a flowchart for illustrating a comparison operation of the input/output circuit 2, and FIG. 6 is a flowchart for illustrating a comparison operation of the monitoring circuit 3.

Figure 5:
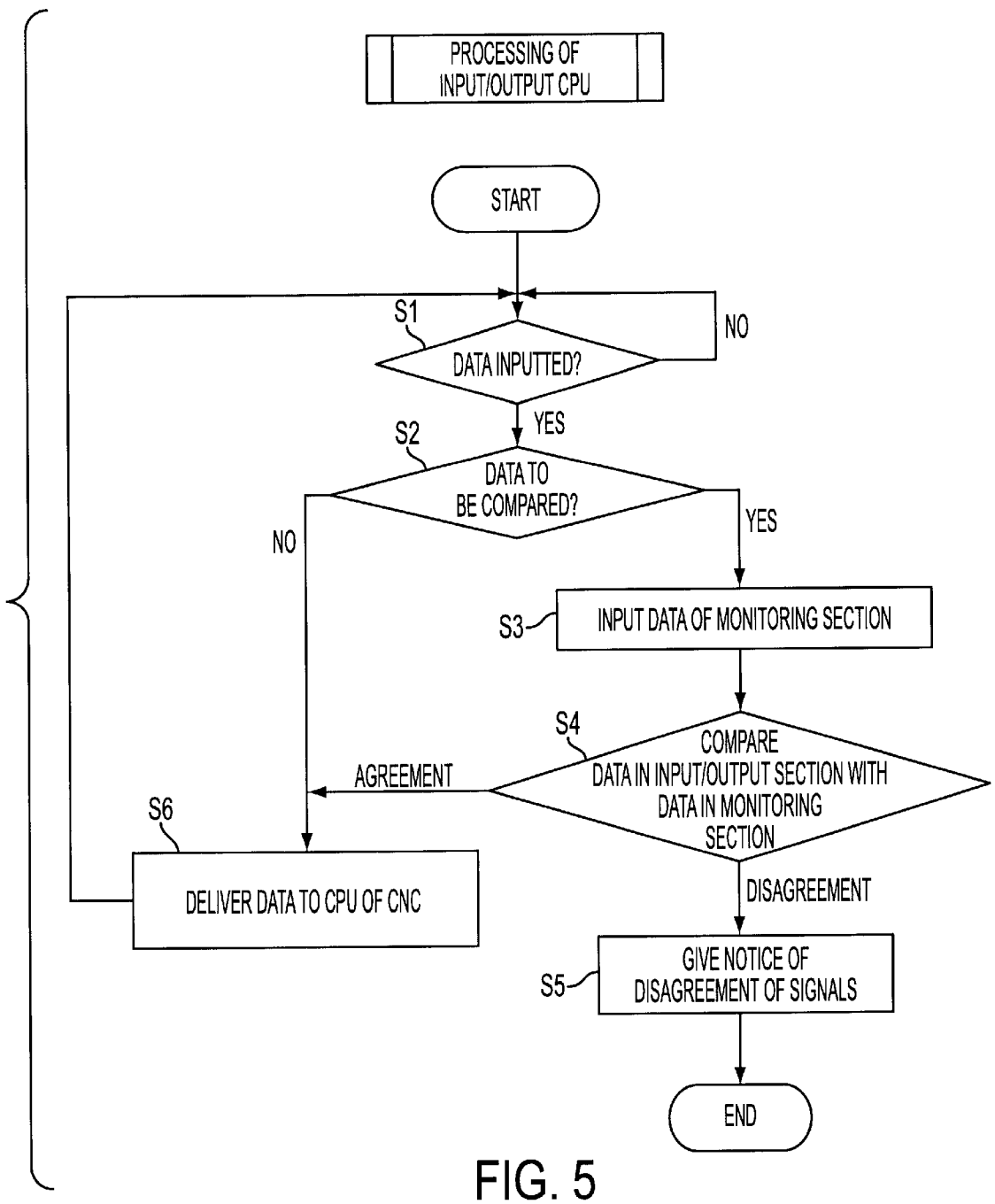
FIG. 5 is a flowchart showing processing performed by a CPU in an input/output section of the numerical controller shown in FIG. 3.

In the flowchart shown in FIG. 5, an external signal such as machine information received by the receiving circuit 4 is inputted to the input/output circuit 2 (Step S1). The received external signal includes various data. The monitoring of the receiving circuit can be performed by making a comparison using all these inputted data or by making a comparison using only some data. When the comparison is made by using only some data of the inputted data, the data used for comparison are selected from the inputted data. In this case, the input/output circuit 2 and the monitoring circuit 3 are supposed to have a function for selecting the data, and the data used for monitoring the receiving circuit are determined beforehand (Step S2).

If there are the data used for monitoring the receiving circuit, the data used for the comparison are inputted from the monitoring circuit 3 to the input/output circuit 2 (Step S3), and a comparison with the data of the input/output circuit 2 is made. Thereby, a comparison is made between the external signal inputted through the receiving circuit 4 and the external signal inputted through the receiving circuit 5 (Step S4). In the comparison in Step S4, if the data on the side of the input/output circuit 2 and the data on the side of the monitoring circuit 3 disagree with each other, it is judged that a trouble occurs in either the receiving circuit 4 or the receiving circuit 5. The control section 1 of the numerical controller 10 or the outside of the numerical controller 10 is notified about the disagreement of signals to tell that a trouble has occurred in the receiving circuit (Step S5).

In the comparison in Step S4, if the data on the side of the input/output circuit 2 and the data on the side of the monitoring circuit 3 agree with each other, it is judged that the receiving circuit 4 and the receiving circuit 5 are operating properly. The inputted data of external signal is delivered to the control section 1. Also, if the data which are not compared are inputted in Step S2, the inputted data of external signal is delivered to the control section 1 (Step S6).

Figure 6:
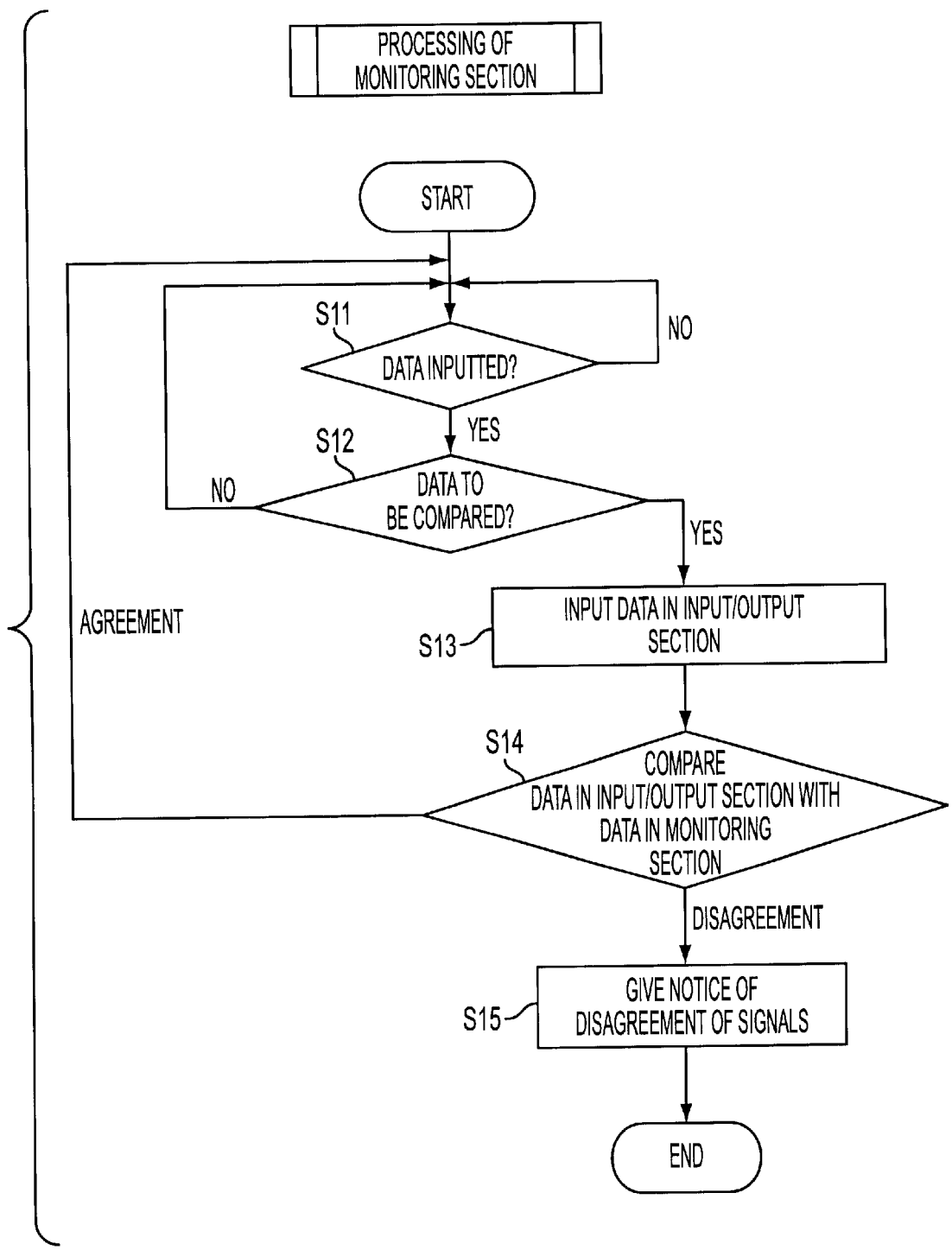
FIG. 6 is a flowchart showing processing performed by a CPU in a monitoring section of the numerical controller shown in FIG. 3.

In the flowchart shown in FIG. 6, the monitoring circuit 3 performs the same processing as the aforementioned processing of the input/output circuit 2. An external signal received by the receiving circuit 5 is inputted to the monitoring circuit 3 (Step S11), and the data used for comparison is selected from the inputted data (Step S12).

If there are the data used for monitoring the receiving circuit, the data used for the comparison is inputted from the input/output circuit 2 to the monitoring circuit 3 (Step S13), and a comparison with the data of the monitoring circuit 3 is made. Thereby, a comparison is made between the external signal inputted through the receiving circuit 4 and the external signal inputted through the receiving circuit 5 (Step S14). In the comparison in Step S14, if the data disagree, the notice of disagreement of received signals is given (Step S15).

If the data agree in the comparison in Step S14, or if the data which are not compared are inputted in Step S12, the monitoring circuit 3 does not deliver the inputted data of external signal to the control section 1, and only the receiving circuit 4 delivers the external signal to the control section 1.

As described above, the input/output circuit 2 and the monitoring circuit 3 receive the external signal from the mating circuit and perform a cross-check for comparing it with the external signal of the own circuit, by which the monitoring of the receiving circuit is performed.

Figure 7:
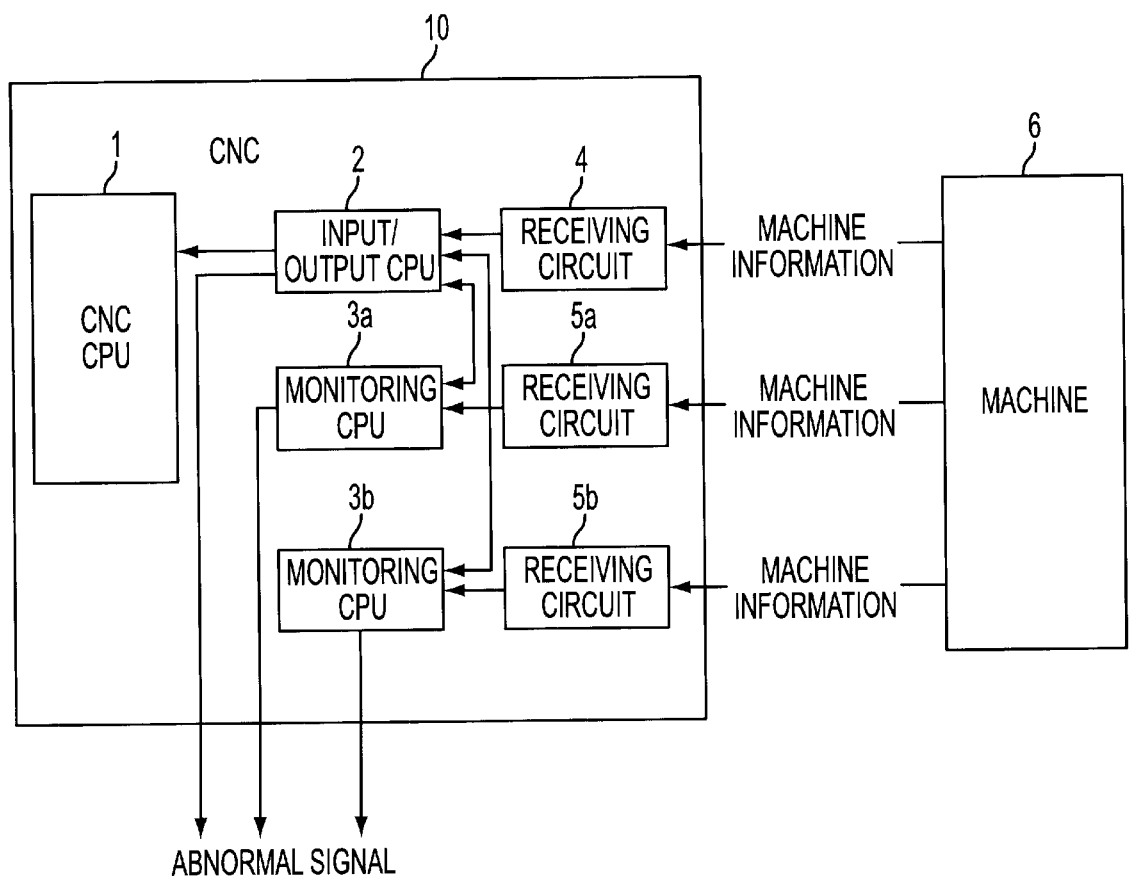
FIG. 7 is a block diagram showing a numerical controller having an arrangement for cross-checking signals received by three or more receiving circuits.
Figure 8:
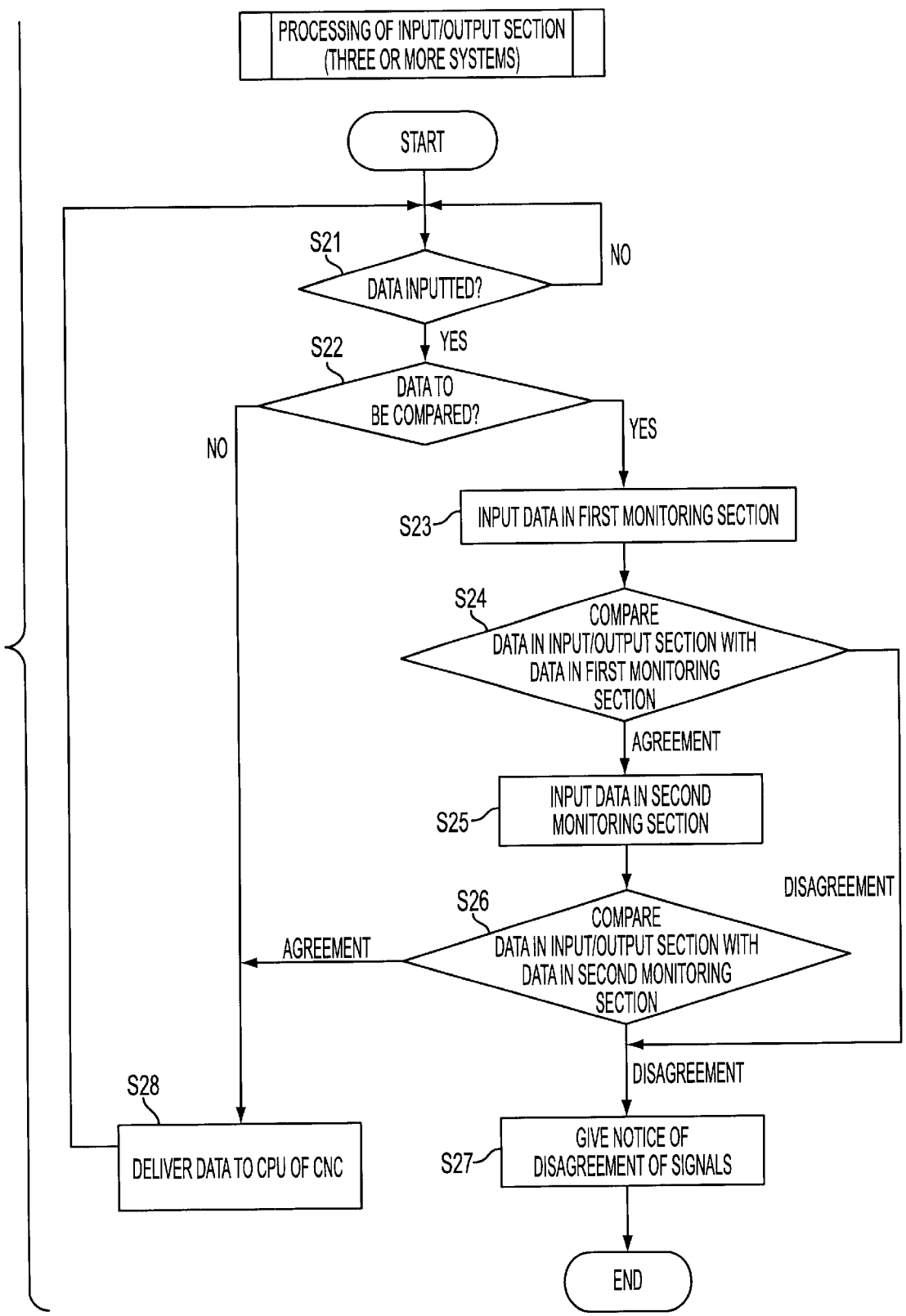
FIG. 8 is a flowchart showing processing performed by a CPU in an input/output section of the numerical controller shown in FIG. 7.
Figure 9:
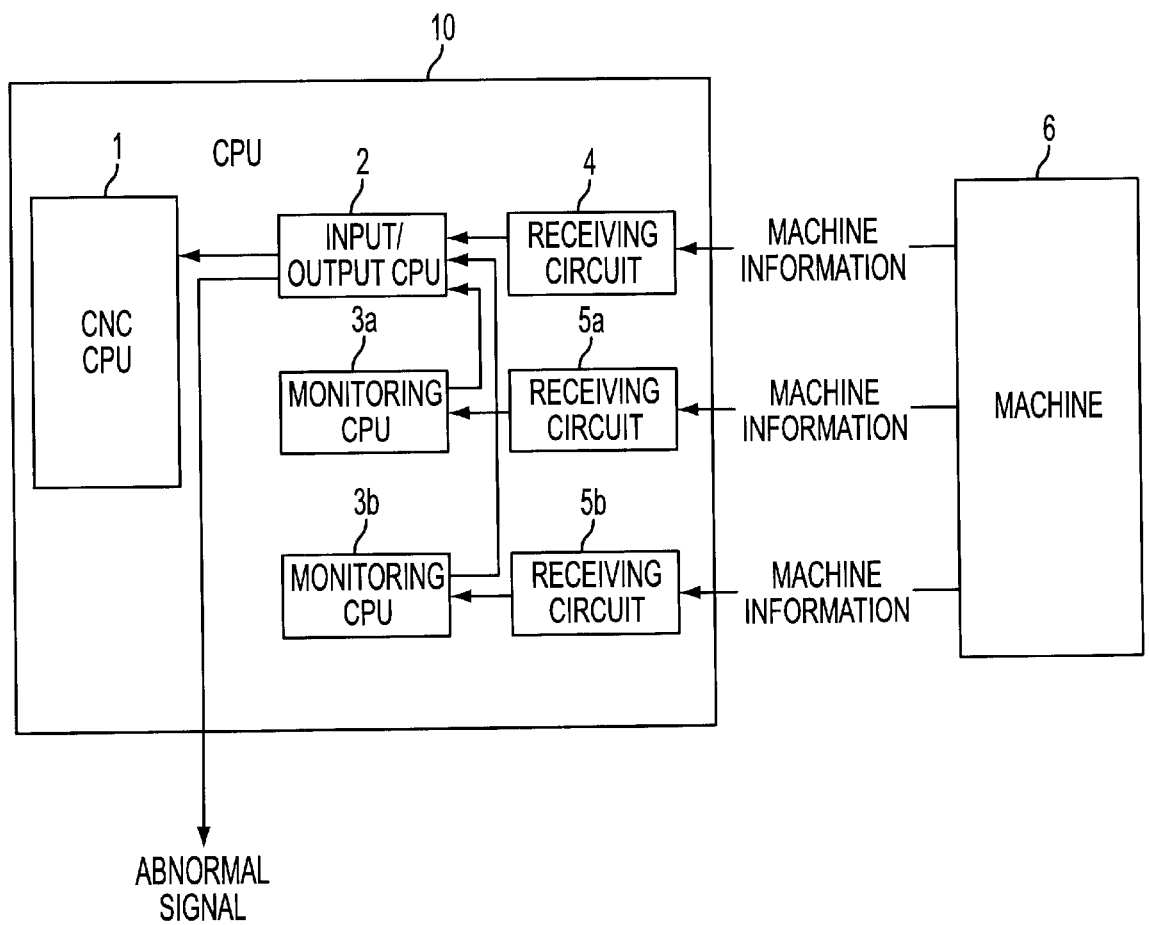
FIG. 9 is a block diagram showing a numerical controller having an arrangement in which a CPU in an input/output section monitors signals received by three or more receiving circuits.
Figure 10:
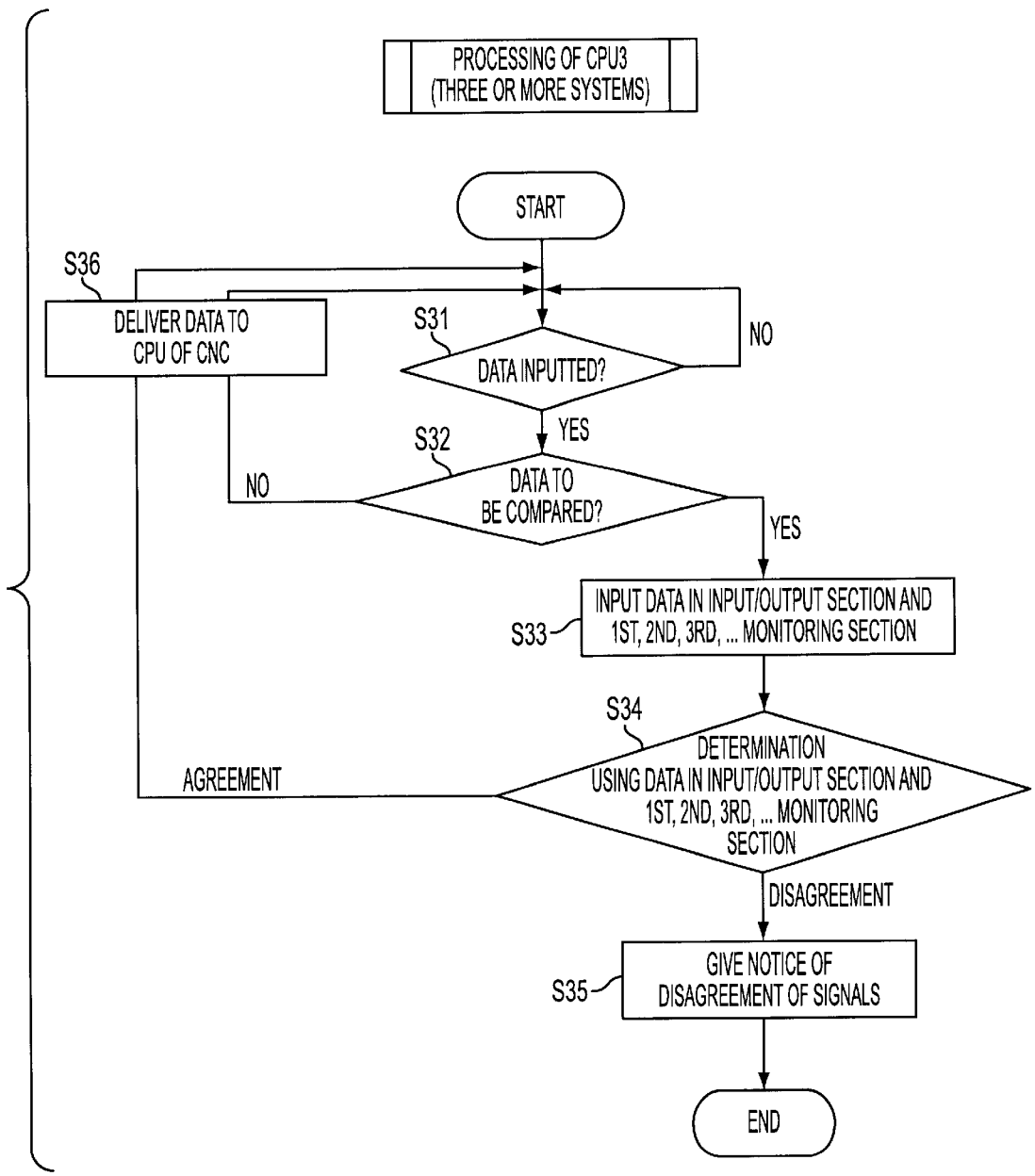
FIG. 10 is a flowchart showing processing performed by a CPU in an input/output section in the configuration shown in FIG. 9.

Next, a configuration having three or more receiving circuits will be explained with reference to schematic block diagrams of FIGS. 7 and 9 and flowcharts of FIGS. 8 and 10. FIGS. 7 and 8 show a first example of configuration, and FIGS. 9 and 10 show a second example of configuration.

Referring to FIG. 7, like the configuration example shown in FIG. 3, a receiving system including a receiving circuit 4 inputs an external signal such as machine information from a machine 6 to a control section 1 via an input/output circuit 2. In order to monitor the receiving circuit 4, receiving circuits 5a and 5b (in the figure, an example is shown in which two receiving circuits are added) and first and second monitoring circuits 3a and 3b are added, and signal lines independent of a signal line for the receiving circuit 4 are connected between the machine 6 and the receiving circuits 5a, 5b, whereby the receiving circuits 5a and 5b receive the same machine information as the machine information received by the receiving circuit 4. The machine information received by the receiving circuits 5a and 5b is sent to the monitoring circuits 3a and 3b, respectively. The machine information received by the receiving circuit 4 and the machine information received by the receiving circuits 5a and 5b are compared by each circuit of the input/output circuit 2 and the first and second monitoring circuits 3a and 3b to make a cross-check.

Figure 4:
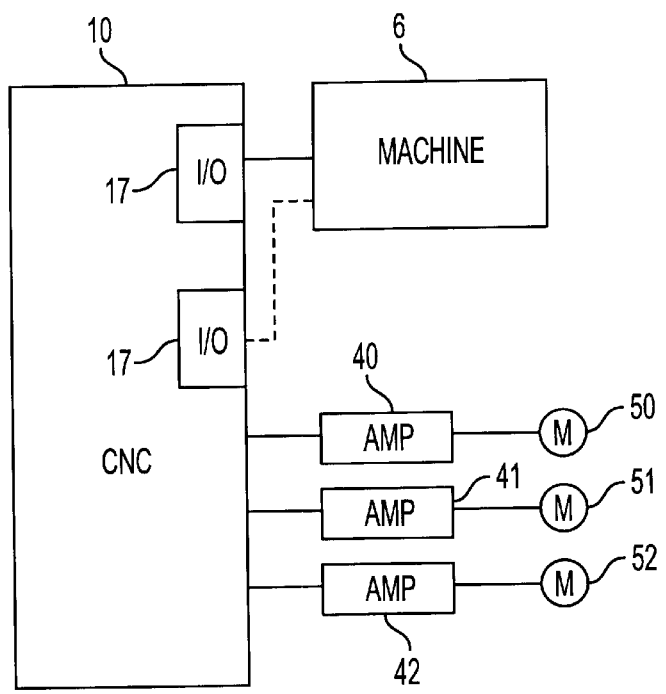
FIG. 4 is a block diagram for illustrating a connection of a numerical controller with a machine.

In the configuration shown in FIG. 7, like the configuration shown in FIG. 4, the numerical controller 10 and the machine 6 are connected to each other by newly adding an I/O unit and a signal line therefor to the numerical controller 10.

In the configuration shown in FIG. 7, the receiving circuit is monitored by the cross-check performed by each circuit of the input/output circuit 2 and the monitoring circuits 3a and 3b, by which an abnormal signal can be outputted from each circuit. FIG. 8 is a flowchart for illustrating a comparison operation of the input/output circuit 2.

In the flowchart shown in FIG. 8, an external signal such as machine information received by the receiving circuit 4 is inputted to the input/output circuit 2 (Step S21). The monitoring of the receiving circuit can be performed by making a comparison using all these inputted data or by making a comparison using only some data. When the comparison is made by using only some data of the inputted data, the data used for comparison are selected from the inputted data In this case, the input/output circuit 2 and the first and second monitoring circuits 3a and 3b are supposed to have a function for selecting the data, and the data used for monitoring the receiving circuit are determined beforehand (Step S22).

If there are the data used for monitoring the receiving circuit, the data used for the comparison are inputted from the first monitoring circuit 3a to the input/output circuit 2 (Step S23), and a comparison with the data of the input/output circuit 2 is made (Step S24).

In the comparison in Step S24, if the data on the side of the input/output circuit 2 and the data on the side of the first monitoring circuit 3a disagree with each other, it is judged that a trouble occurs in either the receiving circuit 4 or the receiving circuit 5a. The control section 1 of the numerical controller 10 or the outside of the numerical controller 10 is notified about the disagreement of signals to tell that a trouble has occurred in the receiving circuit (Step S27).

In the comparison in Step S24, if the data on the side of the input/output circuit 2 and the data on the side of the first monitoring circuit 3a agree with each other, the data used for the comparison are inputted from the second monitoring circuit 3b to the input/output circuit 2 (Step S25), and a comparison with the data of the input/output circuit 2 is made (Step S26).

In the comparison in Step S26, if the data on the side of the input/output circuit 2 and the data on the side of the second monitoring circuit 3b disagree with each other, it is judged that a trouble occurs in either the receiving circuit 4 or the receiving circuit 5b. The control section 1 of the numerical controller 10 or the outside of the numerical controller 10 is notified about the disagreement of signals to tell that a trouble has occurred in the receiving circuit. Thereby, a comparison is made between the external signal inputted through the receiving circuit 4 and the external signals inputted through the receiving circuits 5a and 5b (Step S27).

In the comparison in Step S26, if the data on the side of the input/output circuit 2 and the data on the side of the second monitoring circuit 3b agree with each other, it is judged that the receiving circuit 4 and the receiving circuits 5a and 5b are operating properly. The inputted data of external signal is delivered to the control section 1. Also, if the data which are not compared are inputted in Step S22, the inputted data of external signal is delivered to the control section 1 (Step S28).

In the configuration example shown in FIG. 7, the operation of the monitoring circuit is almost the same as the flowchart shown in FIG. 8 except for the process in which the data are not delivered to the control section, so that the explanation thereof is omitted.

Referring to FIG. 9, like the configuration example shown in FIG. 7, a receiving system including a receiving circuit 4 inputs an external signal such as machine information from a machine 6 to a control section 1 via an input/output circuit 2. In order to monitor the receiving circuit 4, receiving circuits 5a and 5b (in the figure, an example is shown in which two receiving circuits are added) and monitoring circuits 3a and 3b are added, and signal lines independent of a signal line for the receiving circuit 4 is connected between the machine 6 and the receiving circuits 5a, 5b, whereby the receiving circuits 5a and 5b receive the same machine information as the machine information received by the receiving circuit 4. The machine information received by the receiving circuits 5a and 5b is sent to the first and second monitoring circuits 3a and 3b, respectively. The machine information received by the receiving circuits 5a and 5b is inputted from the first and second monitoring circuits 3a and 3b to the input/output circuit 2, and a comparison of data is made in the input/output circuit 2.

In the configuration shown in FIG. 9, like the configuration shown in FIG. 7, the numerical controller 10 and the machine 6 are connected to each other by newly adding an I/O unit and a signal line therefor to the numerical controller 10.

In the configuration shown in FIG. 9, the receiving circuit is monitored by the comparison with the external signal received by other receiving circuit in the input/output circuit 2, by which an abnormal signal can be outputted from the input/output circuit 2. FIG. 10 is a flowchart for illustrating a comparison operation of the input/output circuit 2.

In the flowchart shown in FIG. 10, an external signal such as machine information received by the receiving circuit 4 is inputted to the input/output circuit 2 (Step S31). When the comparison is made by using only some data of the inputted data, the data used for comparison are selected from the inputted data. In this case, the input/output circuit 2 and the first and second monitoring circuits 3a and 3b are supposed to have a function for selecting the data, and the data used for monitoring the receiving circuit are determined beforehand (Step S32).

If there are the data used for monitoring the receiving circuit, the data used for the comparison are inputted from the first and second monitoring circuits 3a and 3b to the input/output circuit 2 (Step S33), and a comparison with the data of the input/output circuit 2 is made (Step S34).

In the comparison in Step S34, if the data on the side of the input/output circuit 2 and the data on the side of the first monitoring circuit 3a disagree with each other, it is judged that a trouble occurs in either the receiving circuit 4 or the receiving circuit 5a. The control section 1 of the numerical controller 10 or the outside of the numerical controller 10 is notified about the disagreement of signals to tell that a trouble has occurred in the receiving circuit (Step S35).

In the comparison in Step S34, if the data on the side of the input/output circuit 2 and the data on the side of the first and second monitoring circuits 3a and 3b disagree with each other, it is judged that a trouble occurs in either the receiving circuit 4 or the receiving circuit 5a, 5b. The control section 1 of the numerical controller 10 or the outside of the numerical controller 10 is notified about the disagreement of signals to tell that a trouble has occurred in the receiving circuit. Thereby, a comparison is made between the external signal inputted through the receiving circuit 4 and the external signals inputted through the receiving circuits 5a and 5b. The criterion for the comparison of a large number of signals can be established arbitrarily; for example, it can be established by the whole agreement or the agreement of majority of the plurality of external signals.

In the comparison in Step S34, if the data on the side of the input/output circuit 2 and the data on the side of the first and second monitoring circuit 3a and 3b agree with each other, it is judged that the receiving circuit 4 and the receiving circuits 5a and 5b are operating properly. The inputted data of external signal is delivered to the control section 1. Also, if the data which are not compared are inputted in Step S32, the inputted data of external signal is delivered to the control section 1 (Step S36).

Also, another configuration having two receiving circuits will be explained with reference to a schematic diagram of FIG. 11 and a schematic diagram for illustrating the a connection of a numerical controller with a machine of FIG. 12.

Figure 11:
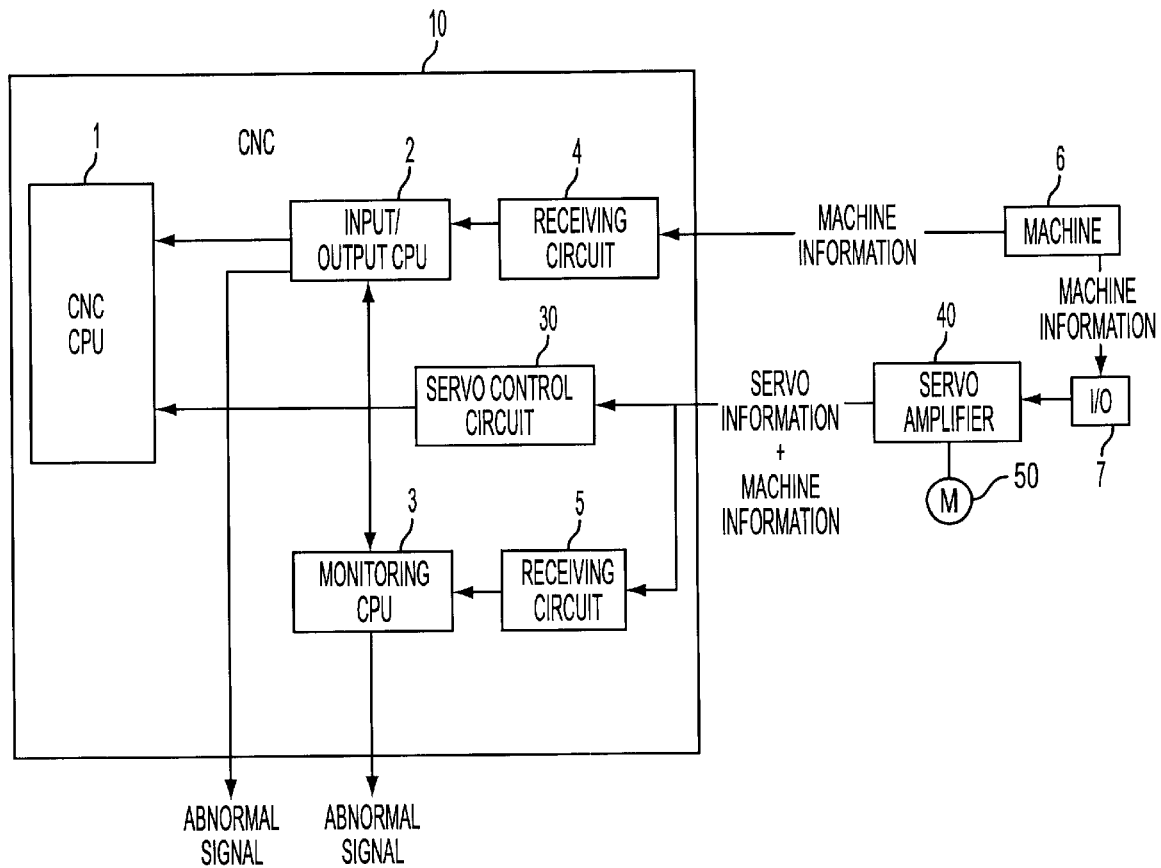
FIG. 11 is a block diagram showing another arrangement of a numerical controller for cross-checking signals received by two receiving circuits.
Figure 12:
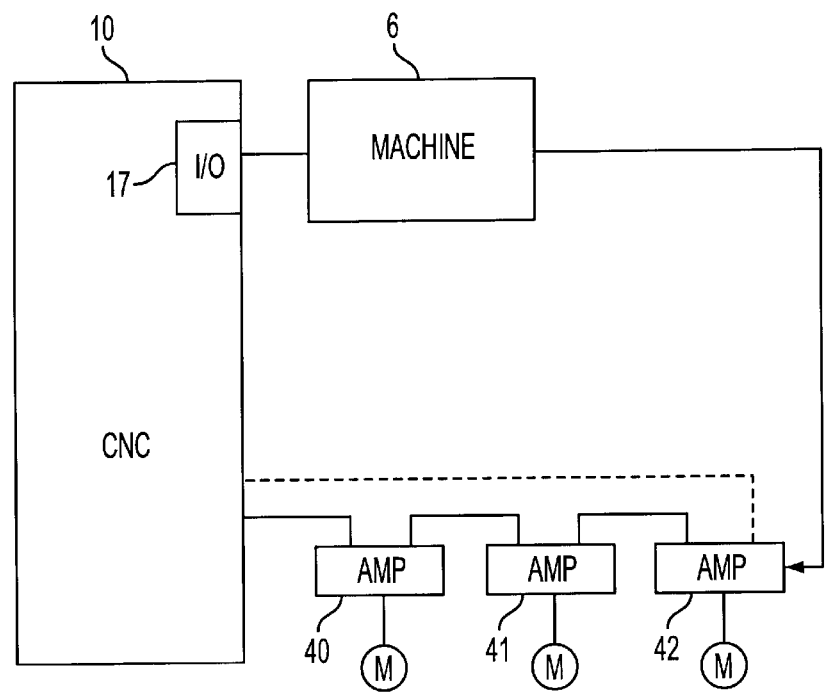
FIG. 12 is a block diagram for illustrating a connection of the numerical controller shown in FIG. 11 with a machine.
Figure 13:
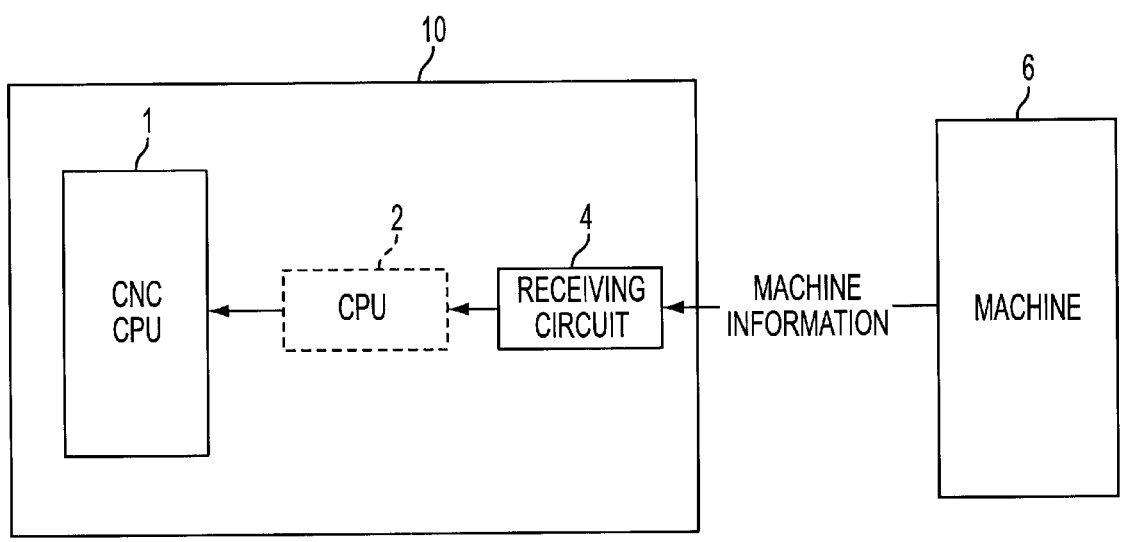
FIG. 13 is a block diagram showing a configuration of an external information receiving section in a conventional numerical controller.

FIG. 12 shows a configuration in which amplifier circuits 40, 41 and 42 such as servo amplifiers are connected in a link form to a numerical controller 10. In the configuration example shown in FIG. 11, machine information for monitoring a receiving circuit is inputted to the side of the numerical controller 10 by using a signal line used for this link connection. By this configuration, machine information can be inputted by using the existing signal line, so that time and facility required for connecting a new signal line to the numerical controller can be saved.

In FIG. 11, a receiving system including a receiving circuit 4 inputs an external signal such as machine information from a machine 6 to a control section 1 via an input/output circuit 2. Also, the numerical controller 10 has a servo control circuit 30 connected to one end of the amplifier circuits 40, 41 and 42 to get servo information from the amplifier circuits 40, 41 and 42 such as servo amplifiers. In this configuration example, a receiving circuit 5 and a monitoring circuit 3 are added to the servo control circuit 30 to monitor the receiving circuit 4. Also, the machine 6 is connected to one end of the amplifier circuits 40, 41 and 42 via an I/O unit 7. The machine information of the machine 6 is led into the numerical controller 10 via the I/O unit 7 and the amplifier circuits, and inputted to the receiving circuit 5 and the monitoring circuit 3.

As in the configuration example shown in FIG. 3, external signals such as machine information received by the receiving circuit 4 and the receiving circuit 5 are compared by both of the input/output circuit 2 and the monitoring circuit 3 to make a cross-check. In this configuration example, the operation for cross-check of external signal is the same as that shown in FIGS. 3, 5 and 6, so that the explanation thereof is omitted.

According to the controller in accordance with the present invention, a plurality of receiving circuits for receiving an external signal are provided, and by comparing the external signals such as machine information received by the receiving circuits, the receiving circuit can be monitored. Also, by configuring the controller so that the external signal is inputted via a line of amplifier circuits such as servo amplifiers connected to the numerical controller, the addition of line to the numerical controller can be omitted.

What is claimed is:

1. A controller for controlling an industrial machine comprising:
    a plurality of receiving means provided independently of one another for respectively receiving a same signal from the industrial machine; and
    monitoring means for comparing signals received by said plurality of receiving means, the signals all originating from a same source of the industrial machine and identifying a disagreement of the signals based on a result of the comparison.

2. A controller according to claim 1, wherein said receiving means includes a receiving circuit and a signal line for connecting with the industrial machine.

3. A controller according to claim 2, wherein said signal line connects a numerical controller with a servo amplifier of the industrial machine.

4. A controller according to claim 1, wherein said monitoring means selects signals to be compared, from the signals received by said receiving means.

5. A controller according to claim 1, wherein said monitoring means notifies the controller or an external equipment of an abnormality of said receiving means.

6. A controller according to claim 1, wherein said monitoring means is provided commonly to said plurality of receiving means.

7. A controller according to claim 1, wherein a plurality of monitoring means are provided, each associated with each of said plurality of receiving means.

8. A controller according to claim 7, wherein one of said plurality of monitoring means receives the signals received by the receiving means associated with the others of said monitoring means, from said others of monitoring means.

9. A controller according to claim 8, wherein said one monitoring means compares the signals received by the receiving means associated with said others of monitoring means with the signal received by the receiving means associated with said one monitoring means.

10. A controller according to claim 8, wherein one of said other monitoring means receives the signal received by the receiving means associated with said one monitoring means from said one monitoring means, and compares the signal received by the receiving means associated with said one monitoring means with the signal received by the receiving means associated with said one of the other monitoring means.

11. An apparatus comprising:
    a first receiving unit receiving first machine information from a machine and transmitting the first machine information to a monitoring unit;
    a second receiving unit receiving second machine information which comes from a same signal as the first machine information and transmitting the second machine information to the monitoring unit; and the monitoring unit monitoring the first machine information and the second machine information, and identifying a disagreement of the first machine information and the second machine information.

12. An apparatus as recited in claim 11, further comprising a notifying unit notifying the machine when the monitoring unit identifies the disagreement.

13. A method comprising:

receiving first machine information from a machine and transmitting the first machine information to a monitoring unit;

receiving second machine information from a same original source of the machine and transmitting the second machine information to the monitoring unit; and monitoring the first machine information and the second machine information, and identifying a disagreement of the first machine information and the second machine information.

14. A method as recited in claim 13, further comprising notifying the machine when the monitoring unit identifies the disagreement.

* * * * *